US009015357B2

(12) United States Patent
Hunkins et al.

(10) Patent No.: US 9,015,357 B2
(45) Date of Patent: Apr. 21, 2015

(54) METHOD AND DEVICE FOR PROVIDING HIGH SPEED DATA TRANSMISSION WITH VIDEO DATA

(71) Applicant: ATI Technologies ULC, Markham (CA)

(72) Inventors: James D. Hunkins, Toronto (CA); Collis Quinn Carter, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 13/656,796

(22) Filed: Oct. 22, 2012

(65) Prior Publication Data

US 2014/0115192 A1    Apr. 24, 2014

(51) Int. Cl.
*G06F 13/00* (2006.01)
*G06F 13/24* (2006.01)
*G06F 13/32* (2006.01)

(52) U.S. Cl.
CPC .............. *G06F 13/24* (2013.01); *G06F 13/32* (2013.01)

(58) Field of Classification Search
CPC ........ G06F 13/385; G06F 13/24; G06F 13/32
See application file for complete search history.

(56) References Cited

U.S. PATENT DOCUMENTS

| | | | |
|---|---|---|---|
| 7,222,290 B2 * | 5/2007 | Guo et al. | 714/811 |
| 7,844,762 B2 * | 11/2010 | Banks et al. | 710/62 |
| 8,341,325 B2 * | 12/2012 | Goodart et al. | 710/313 |
| 8,532,098 B2 * | 9/2013 | Reed et al. | 370/389 |
| 2008/0279186 A1 | 11/2008 | Winter et al. | |
| 2008/0285568 A1 | 11/2008 | Oren et al. | |
| 2010/0111100 A1 | 5/2010 | Baumer | |
| 2011/0243035 A1 | 10/2011 | Hall et al. | |
| 2012/0012357 A1 * | 1/2012 | Horan et al. | 174/103 |
| 2012/0012387 A1 * | 1/2012 | Horan et al. | 174/74 R |

OTHER PUBLICATIONS

International Search Report and Written Opinion mailed Jan. 16, 2014 in related International Application No. PCT/CA2013/050795.

* cited by examiner

*Primary Examiner* — Henry Tsai
*Assistant Examiner* — John Roche
(74) *Attorney, Agent, or Firm* — Faegre Baker Daniels LLP (57) ABSTRACT

A method and device for operating a data link having multiple data lanes is provided. The method includes supplying first data (such as video data that follows the DisplayPort protocol) on one or more data lanes of a data interface between a video source device and a video sink device. In addition to being video stream data (such as the above mentioned DisplayPort video data) the first data can also be audio stream data (such as DisplayPort audio data), source-sink interface configuration data (such as DisplayPort AUX data) and sink related interrupt data (such as DisplayPort Hot Plug Detect "HPD" data). The method also includes receiving second data on one or more unidirectional data lanes of the data interface. The second data being data other than video stream data, source-sink interface configuration data and sink related interrupt data.

34 Claims, 5 Drawing Sheets

METHOD AND DEVICE FOR PROVIDING HIGH SPEED DATA TRANSMISSION WITH VIDEO DATA

FIELD OF THE DISCLOSURE

The present disclosure is related to methods and devices for providing data transmission between video source and sink hardware. The present disclosure is related more specifically to methods and devices for providing high speed bidirectional transmission of non-video related data along with video data over a unified cable.

BACKGROUND

DisplayPort (DP) architecture utilizes a link service within a source device to discover, configure and maintain a link with devices it connects to. The link service configures the link through what is known as link training. Link training is a process where the correct number of lanes are enabled and the signals are tuned at the required link rate via a handshake between the DisplayPort transmitter (graphics output) and receiver (repeater, hub or display) over an auxiliary channel.

The traditional DisplayPort interface provides an AC-coupled voltage-differential interface. The interface consists of three different channels: a main link, an AUX channel, and a hot plug detect (HPD). The main link features one, two or four scalable data pairs (or lanes) that can be operated at different rates (Gbit/sec). The main link lanes and the AUX channel are differential signals formed from twisted pairs of lines and the HPD is a single wire. The AUX channel is physically like the main link channels, yet is not called upon to transmit data at high speed. The AUX channel and HPD channel are also not required to provide constant data streams. Accordingly, the potential of the AUX channel is thus under-utilized.

The only communication upstream (from receiver to transmitter) is over the AUX channel and HPD channel. The AUX channel, which also provides downstream path alternately with the upstream path, only provides slow transmission (relative to the speed of the main link) and the HPD signal only provides a binary status function. Furthermore, the AUX pair is primarily dedicated to transmitting information regarding the connection quality and existence. DisplayPort does not provide transmission of high speed data other than video display and audio on the main DP channels. Standards have been proposed that send touch screen data upstream along the bi-directional, relatively low speed, AUX channel.

Furthermore, displays are not provided in a manner in which to communicate upstream at high speed to convey the inputs received thereby without additional data connections and wires. Similarly, current DisplayPort technology fails to allow devices such as video cameras, hard drives and network connections to be operated thereover.

Accordingly, high speed upstream data requires additional cabling. Such additional cabling, connectors and ports therefor provide increased costs. In devices such as laptops with hinged screens, additional wires provide additional failure points.

Technology has been developed under the name "Thunderbolt" that combines PCI Express and DisplayPort into a serial data interface. Thunderbolt thus provides for bi-directional data communication. Thunderbolt requires an active cable (copper cables that use silicon chips in the connectors to boost the performance of the cable). The cable has high speed differential pairs of wires for data flow in each direction along with wiring for management purposes. The active nature of the cable and the hardware controllers to handle the data cause the Thunderbolt solution to be relatively expensive.

Accordingly, there exists a need for a device and method that allows for bi-directional high speed data over passive cables. There further exists a need to provide communication that takes better advantage of the capabilities of wires provided for existing DisplayPort lanes. There further exists a need to provide methods and devices that better handle AUX and HPD data to free up data lanes for other data traffic.

DETAILED DESCRIPTION OF EMBODIMENTS

In an exemplary and non-limited embodiment, aspects of the invention are embodied in a method of operating a data link having multiple data lanes. The method includes supplying first data (such as video and/or audio data that follows the DisplayPort protocol) on one or more data lanes of a data interface between a video source device and a video sink device. In addition to being video stream data (such as the above mentioned DisplayPort video data), the first data can also be audio stream data (such as DisplayPort audio data), source-sink interface configuration data (such as DisplayPort AUX data) and sink related interrupt data (such as DisplayPort Hot Plug Detect "HPD" data). The method also includes receiving second data on one or more unidirectional data lanes of the data interface. The second data being data other than video stream data, audio stream data, source-sink interface configuration data and sink related interrupt data.

Briefly, in one example, a data interface includes a first node operable to supply a first signal. The first signal includes at least one of video stream data, audio stream data, source-sink interface configuration data and sink related interrupt data, the first node operable to interface with a first wire of a first cable. The data interface also includes a second node operable to receive a second signal, the second signal including data other than video stream data, audio stream data, source-sink interface configuration data and sink related interrupt data, the second node operable to interface with a second wire of the first cable to receive the second signal from a first unidirectional incoming data lane.

In another example, a computer readable medium is provided containing non-transitory instructions thereon, that when interpreted by at least one processor, cause the at least one processor to supply first data on one or more data lanes of a data connection, the first data including at least one of video stream data, audio stream data, source-sink interface configuration data, and sink related interrupt data; and receive second data on one or more unidirectional data lanes of the data lanes of the data interface, the second data including data other than video stream data, audio stream data, source-sink interface configuration data, and sink related interrupt data.

In yet another example, a method of operating a data link requiring link training is provided including combining link maintenance data with content data and providing the combined data to a port operable to transmit the combined data on a first data lane.

In another example, a method of operating a source-sink data link is provided including receiving source-sink link configuration data on a first unidirectional data lane.

In still another example, a data link is provided having data lanes including a first lane operable to supply video content data and data link configuration data.

In certain embodiments, a computer readable medium containing non-transitory instructions thereon is provided, that when interpreted by at least one processor, cause the at least one processor to supply video content data and source-sink link configuration data on a first data lane of a data connection.

Figure 1:
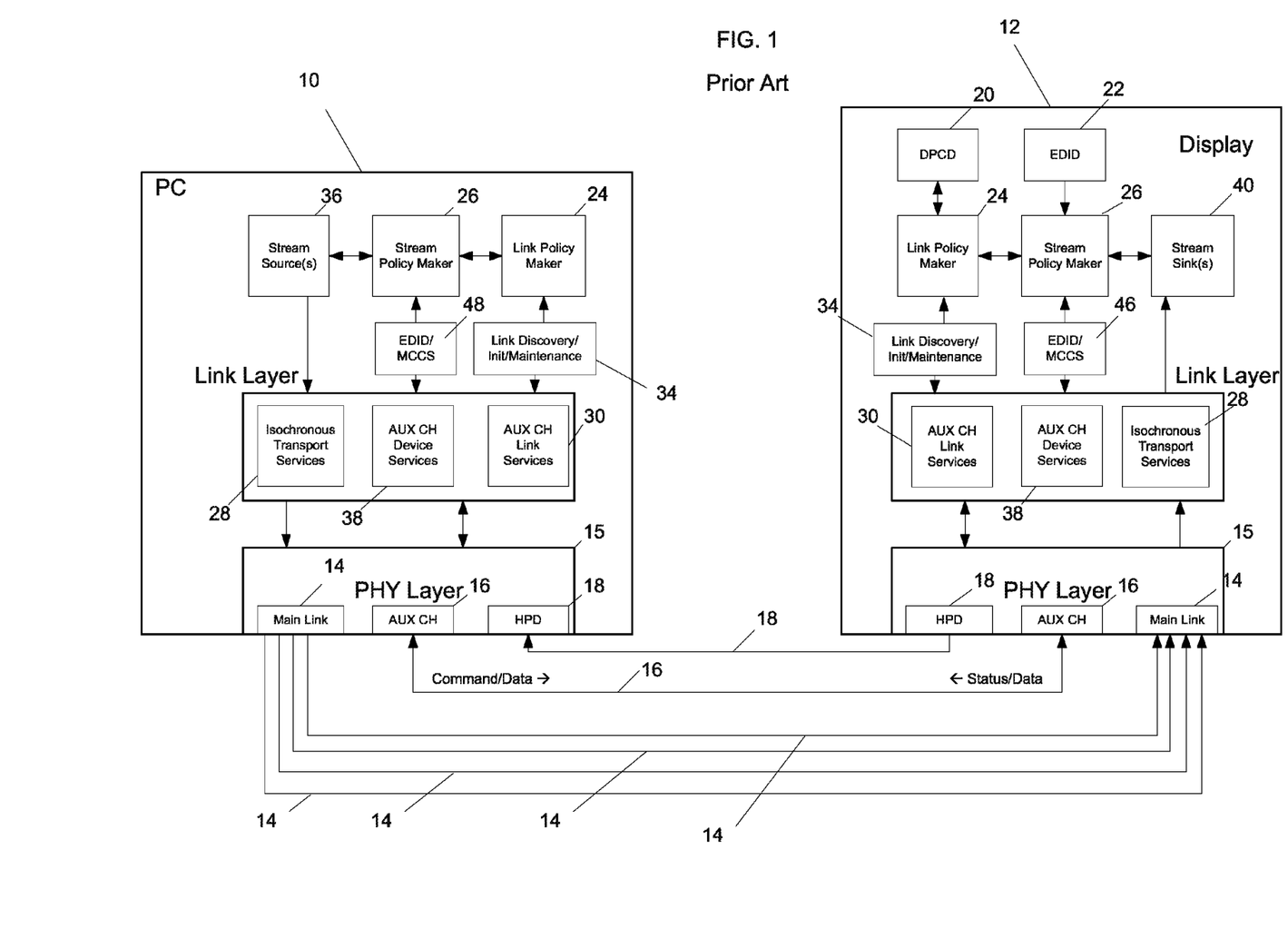
FIG. 1 is a diagram showing architecture of a system employing DisplayPort technology.

FIG. 1 shows architecture for providing video information from a device (PC 10) to a display (panel 12) having DisplayPort architecture. DisplayPort provides an AC-coupled voltage-differential interface. The interface consists of three different channels: main link 14, AUX channel 16 and hot plug detect (HPD) 18. Main link 14 (also referred to as a lane, lanes, cable and channel) features one, two or four scalable data pairs (or lanes) that can be operated at different rates (Gbit/sec). Main link 14 is responsible for transmitting DisplayPort video data thereon. These features are implemented by settings within a PHY layer 15. Main link 14 is responsible for transmission of a stream from stream source 36. The main link rate is determined by a number of factors, including the capabilities of the transmitter and receiver (i.e. display and graphics source device) the quality of the cable and the noise in the system. Among other things, PHY layer 15 is responsible for directing electrical connections such as I/O pins or nodes into connection with desired sources and sinks. The stream is ultimately supplied to stream sink 40 of display 12.

DisplayPort configuration data (DPCD) 20 in the display describes the receiver's capabilities and stores the display's connection status. Extended Display Identification Data (EDID) 22 tells the source device (PC 10) of the capabilities of display 12 once it is connected. Link policy maker 24 and stream policy maker 26 manage the link and the stream respectively.

The link layer is responsible for the isochronous transport 28, link 30, and device 38 services. In the output device (i.e. the graphics card, GPU), the isochronous transport service 28 maps the video and audio streams into a format with a set of rules that main link 14 will understand so that the data can scale across the number of lanes available in main link 14. Additionally, when the data reaches display 12, the rules allow the streams to be reconstructed into their original format.

Link service 30 is used to discover, configure and maintain the link with devices it connects to. Link service 30 does this using DPCD 20 via auxiliary channel (AUX) 16. When hot-plugging is detected via hot-plug channel 18, PC 10 (or other source device) reads the capabilities of the receiver of the display 12 via DPCD 20 and embodied at least partially in EDID 22. This data is transferred to the link layer (illustrated at 46), transferred to source device 10, read from the link layer of source device 10 (illustrated at 48) where it is used to configure the link as part of link training.

Link training is a process where various properties of the link are adjusted (number of enabled lanes, link rate, rise and fall time, voltage level and/or slopes of rise and fall) via a handshake between the DisplayPort transmitter (graphics device of PC 10) and receiver (display 12) over auxiliary channel 16. After link training has been completed during normal operation, display 12 can use hot-plug signal 18 as an interrupt to notify PC 10 of critical changes, for example, when a loss of synchronization is detected. Link maintenance is another responsibility of AUX data. Link maintenance happens concurrently with the transmission of display data and includes things such as HDCP data, interrupt checks and configuration updates.

The video data sent on main link 14, the AUX data sent on AUX 16 and the hot plug detect signal sent on HPD 18 are referred to herein collectively as DisplayPort data.

Figure 2:
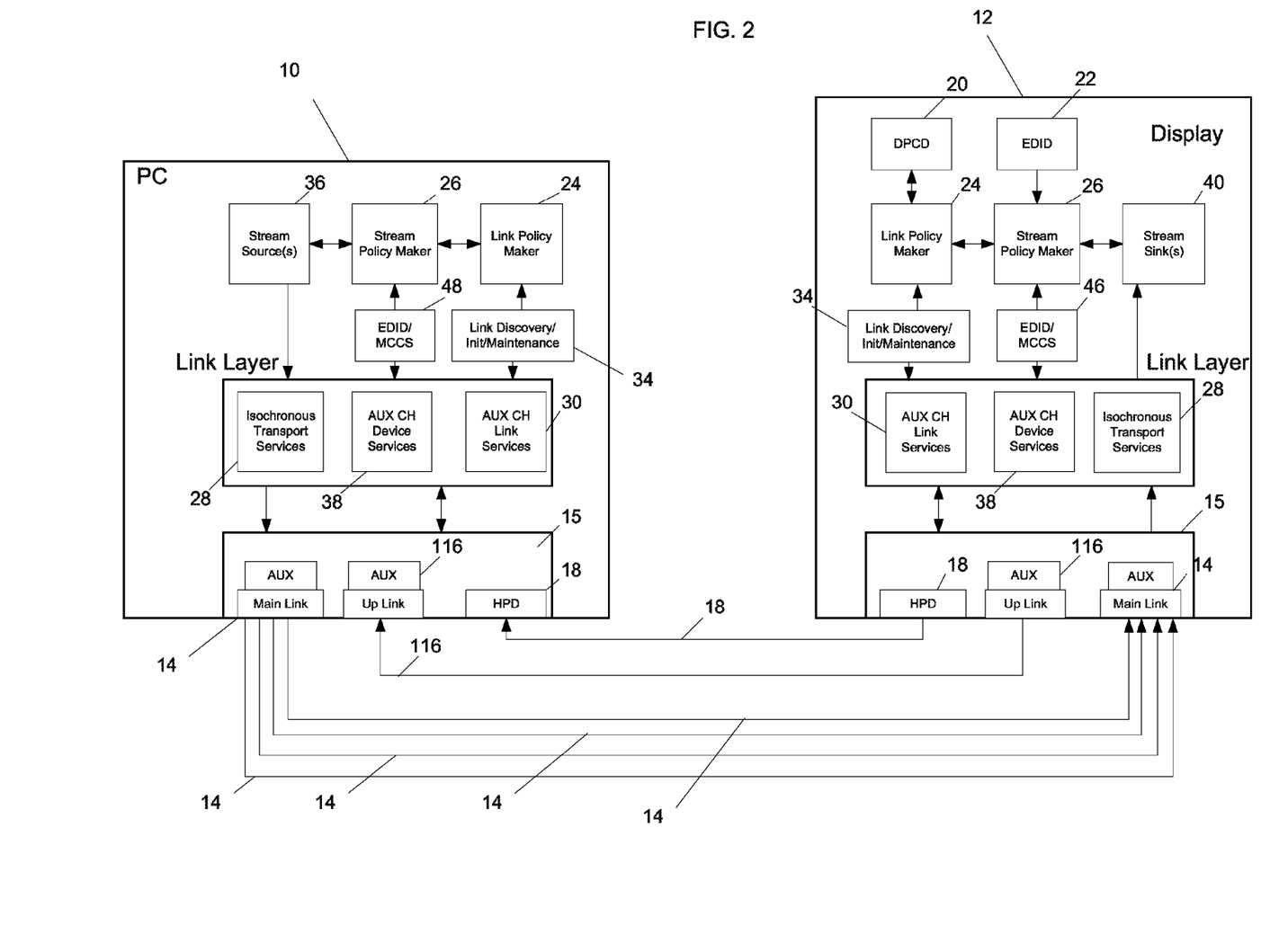
FIG. 2 is a diagram showing a first embodiment architecture for operating a data link in accordance with an embodiment of the present disclosure.

FIG. 2 shows architecture for providing video information from a device (PC 10) to a display (panel 12) having enhanced DisplayPort architecture. The architecture also provides bi-directional data transfer. Enhanced DisplayPort provides an AC-coupled voltage-differential interface. The interface consists of three different channels: main (downstream) link 14, upstream link 116 and hot plug detect (HPD) 18. Main link 14 features one, two or four scalable data pairs (or lanes) that can be operated at different rates (Gbit/sec). Upstream link 116 operates over one (FIG. 2) or two (FIG. 3) scalable pairs. Upstream link 116 operates wires where the former AUX channel 16 operated, (FIGS. 2 and 3), and in the embodiment of FIG. 3, upstream link 116 operates over the wires previously used for configuration. Whereas AUX channel 16 is a relatively low speed channel used for link training and configuration signals sent along AUX channel 16 are used for static configuration detections, upstream link 116 has speed equal to one lane (FIG. 2) or two lanes (FIG. 3) of main link 14. Accordingly, a cable operable to take advantage of this architecture has five (or six) lanes of high speed cabling 14, 116 and a single wire for HPD 18. In operation, the five/six high speed lanes are configured to transmit video signals and data signals thereacross. Lanes 116 are described as an upstream link, but in reality any of the high speed lanes 14, 116 can be configured to be either upstream or downstream lanes.

Figure 3:
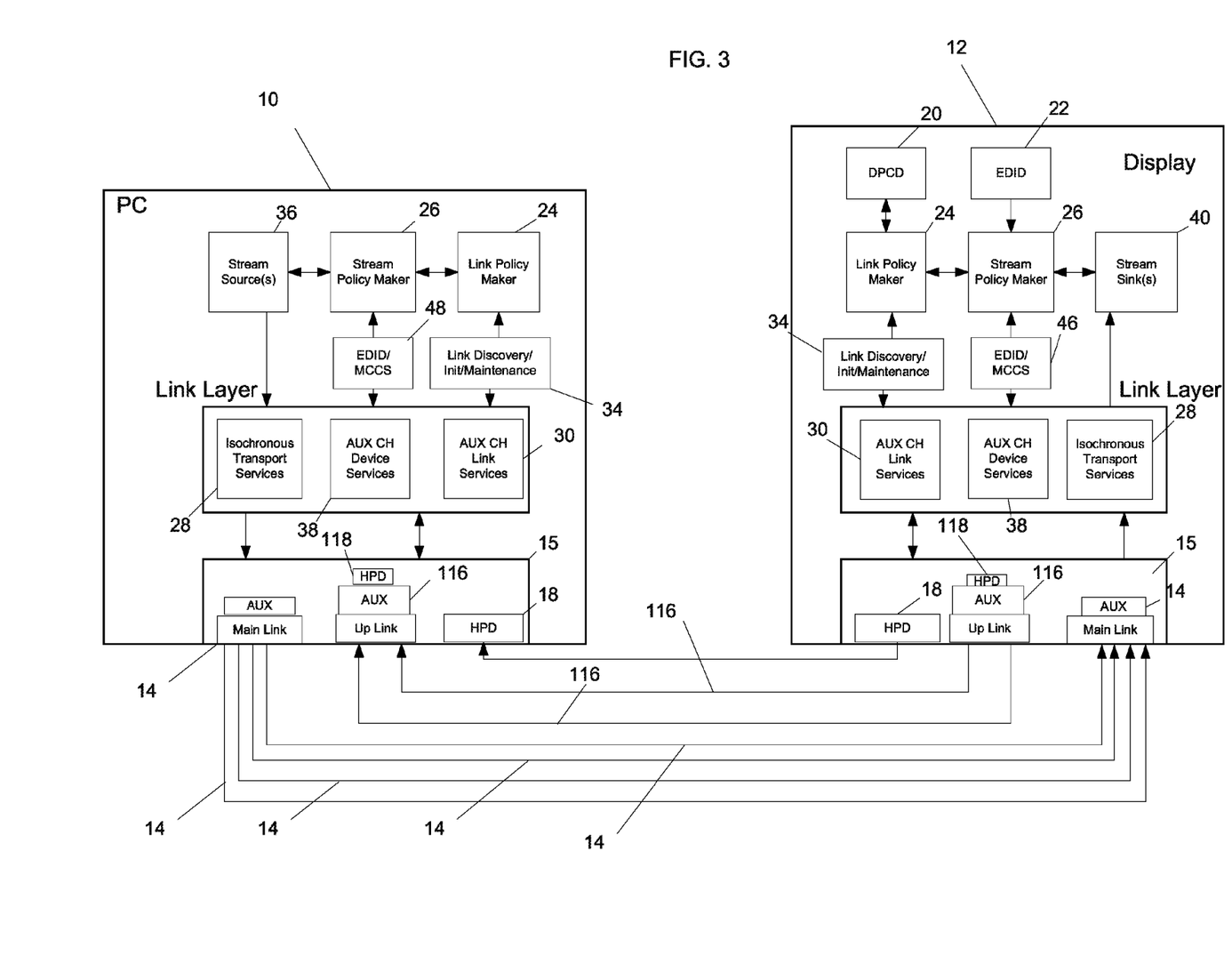
FIG. 3 is a diagram showing a second embodiment architecture for operating a data link in accordance with an embodiment of the present disclosure.

In various embodiments, four lanes are used for main link 14 (as is used in traditional DisplayPort setups) with one or two lanes used for upstream data transfer 116. However, when less than four lanes are used for downstream transfer (video and/or data), the unused lanes can be repurposed for upstream communication. Accordingly, each of the five (or six) combined lanes in main link 14 and upstream link 116 are not dedicated to being either upstream or downstream lanes exclusively, but are unidirectional. Accordingly, as discussed herein "main link" 14 refers to the lane or lanes providing downstream communication and upstream link 116 refers to the lane or lanes providing upstream communication. Regardless of the exact configuration regarding number of lanes, main link 14 is responsible for transmitting video signals and also for sending downstream data. It should be appreciated that link training is performed for both main link 14 and upstream link 116.

Management communication and other low speed data traffic previously relied on functionality provided by AUX channel 16. In the present embodiments, with the traditional AUX channel 16 line no longer dedicated to the functionality previously assigned thereto, the AUX functionality is provided for otherwise. Without a dedicated bi-directional AUX channel and line, the AUX functionality is distributed to main link 14 and upstream link 116. Accordingly, while traditional DisplayPort cabling presents a dedicated physical AUX channel and wire 16, the configuration of the enhanced DisplayPort of this disclosure presents a virtual AUX channel that is woven into the downstream 14 and upstream 116 links.

The features of lanes and data rates are implemented by settings within PHY layer 15. The main link rate and upstream link rate are determined by a number of factors, including the capabilities of the transmitter and receiver (i.e. display or hub and graphics source device), the quality of the cable and the noise in the system.

It should be appreciated that the enhanced DisplayPort operation can work with the standard DisplayPort cable, as long as the cable was built to the DisplayPort specification. The low speed AUX signal pair, as per specification, is designed in the same manner as the main link pairs and can therefore carry the high speed upstream lane with no modification. An enhanced cable is required to support the second lane of upstream traffic (FIG. 3). The change in wiring in the enhanced DisplayPort cable is one that makes two previously static signal wires (CONFIG 1, CONFIG 2) a high speed wire pair (such as a high speed twisted pair). Accordingly, with respect to traditional DisplayPort, the enhanced cable has wires everywhere that wires are required to operate as traditional DisplayPort. Thus, wires designed for enhanced DisplayPort will also work to implement traditional DisplayPort.

Similarly, PHY layers 15 of the components are designed to switch the voltages and signals applied to each wire within the cables. This switching allows adjusting which wires (lanes) are used for upstream and which are used for downstream. The switching further provides for application of signals appropriate for traditional DisplayPort as well as those appropriate for enhanced DisplayPort.

Thus, all components needed for enhanced DisplayPort are backwards compatible with traditional DisplayPort. For a system component with the ability to use enhanced DisplayPort, if any piece of the system (transmitter, cable, receiver) is unable to utilize enhanced DisplayPort, the active components (transmitter, receiver) can detect this and operate as traditional DisplayPort. In the event that the reduced functionality of traditional DisplayPort is employed, notice can be given via an OS tray notifier on the display or otherwise.

Figure 4:
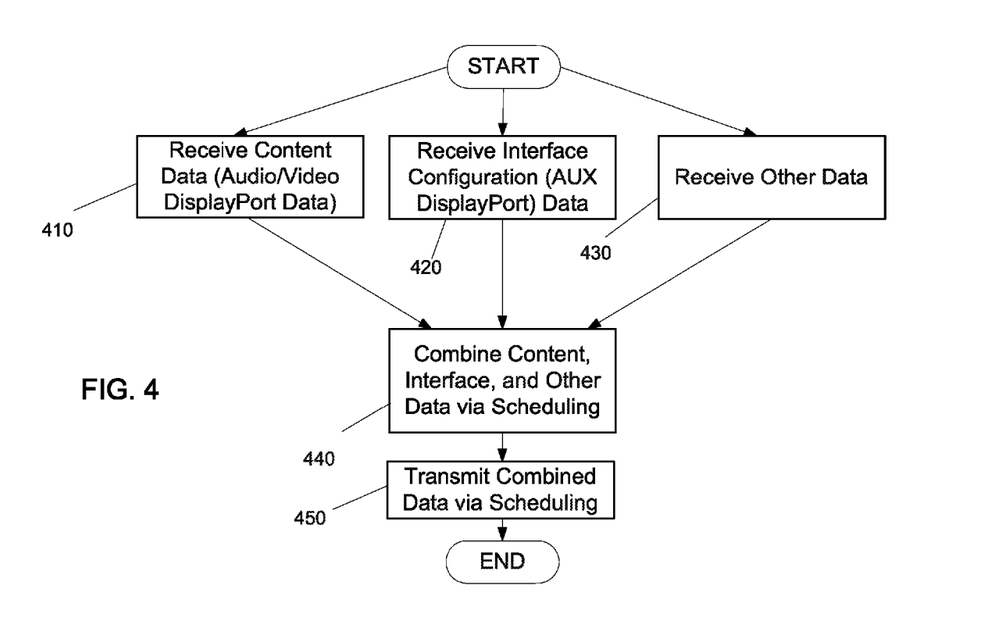
FIGS. 4-7 are flowcharts showing operation of parts of the system of FIGS. 2 & 3 in accordance with an embodiment of the present disclosure.

As described above, the wire within the cabling that was previously dedicated as AUX channel 16 is no longer dedicated therefor. Accordingly, transmissions previously sent on AUX channel 16 (received link training and configuration data, block 420) are sent on downstream 14 and upstream 116 channels by combining (scheduling) (block 440) the AUX packets in with the received display data (block 410) and/or received non-display data (block 430). Thus, a virtualized AUX channel is provided. The combined data signal is then transmitted (block 450).

In enhanced DisplayPort, AUX information is sent as Session Description Protocol (SDP) packets. Downstream packets travel along downstream lanes 14 and upstream packets travel along upstream lanes 116. It should be appreciated that SDP packets have error-correcting code therein and support up to 64 data bytes each. Accordingly, SDP packets support either an AUX or FAUX protocol.

In another embodiment, AUX data is not provided in its own separate packet, but rather is embedded in a header of Multi-stream Transport Packet (MTP). MTP transmissions include link frames. Each link frame has space for 65,536 MTP symbols therein. In the current DisplayPort specification, only 39 the 65,536 symbols are utilized. Accordingly, the vast majority of the header space provided by link frames is unused. This space at current lane speeds provides for communications between 19.5 and 260 Mbit/sec depending on the number of lanes and bit-rate utilized.

Figure 5:
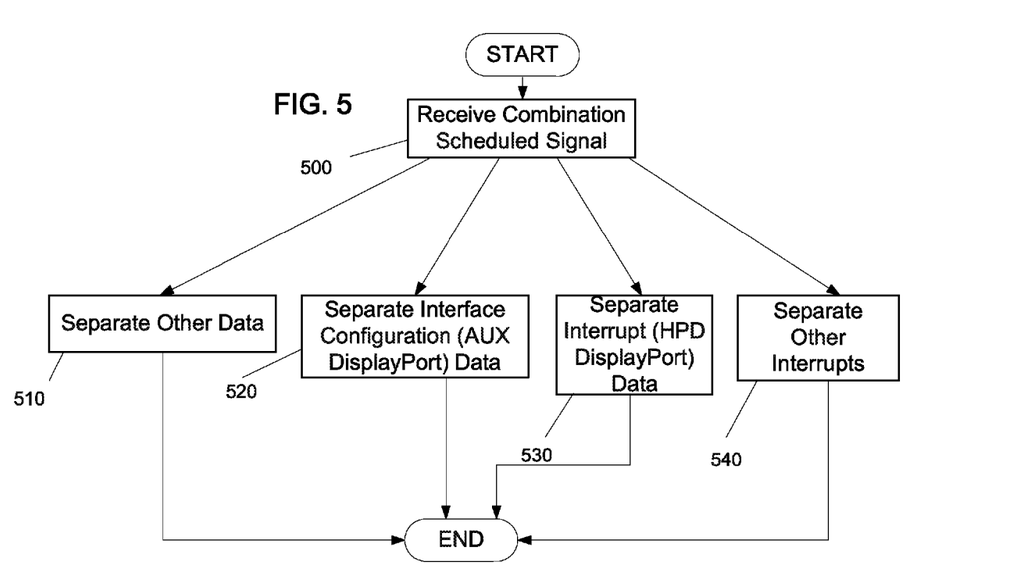

Accordingly, at the transmitting end, the AUX data is parsed and inserted into the header space (block 440). At the receiving end, the headers are read, AUX data is extracted (block 520), and the AUX data is re-assembled. Thus, in the enhanced DisplayPort protocol, AUX data is placed within packets that were already being sent in the traditional DisplayPort protocol. AUX data is thereby transmitted downstream without requiring additional bandwidth.

Enhanced DisplayPort sends traditional DisplayPort signals on downstream main channel 14. Known multi-stream transport packets are used for sending display information. These packets are used regardless of whether non-display data is also being sent on channel 14. During times when display data and non-display data is being sent on channel 14, display packets are given priority.

Data transfer (non-display data) is performed on data in PCIe Gen 2/3 or a tunneled simple protocol. Enhanced DisplayPort adds non-symmetrical data flow (differing numbers of lanes/speed up and down) transparently to traditional PCIe implementations. PCIe traffic is used to support downstream PCIe devices, USB devices, Ethernet devices, etc.

The tunneled simple method provides a direct path to/from system memory across a bus to/from a downstream device. The tunneled simple method allows for communication without the overhead necessary as part of the transfer protocols of PCIe and USB. Data is sent through the CPU/GPU/APU that has a framebuffer therein. This configuration allows for any co-processing called for by data received to be conducted by the graphics unit before the data is required to be placed in the main system memory or sent to the downstream device.

By way of example, when a camera is attached downstream, any uploaded images to be presented to a user can have image processing performed before presentation to a user. The camera is attached and streams data across the connection. The data is streamed into the framebuffer. Processing can then be applied to the streaming image data (sharpening, color correction, etc.). The transmission of the image data is then completed by placing the processed image into main memory. Accordingly, image processing is possible as an integrated feature of the streaming of the data into the system. This arrangement forgoes the requirement to re-read data out of main memory to perform the image processing. This requires less bus usage, less packet overhead transmission and results in faster completion times.

The integrated processing is controlled by a pre-set API interface that is accessible to a programmer to implement. Alternatively, a programmer can create their own openCL (open computing language) code to take advantage of the integrated stream processing.

While enhanced DisplayPort is discussed as using the PCIe Gen 2/3 and tunneled simple method, additional protocols both existing and not yet created are envisioned.

In addition to providing a virtualized AUX channel, functionality of HPD 18 is also virtualized, HPD 118. This is done in parallel to the traditional wired HPD, with the results of both being ORed. HPD 118 operates by sending interrupts upstream to request resources and/or inform upstream devices of events or conditions present in downstream devices. In traditional DisplayPort implementations, downstream devices are displays and display hubs (DisplayPort devices). In enhanced DisplayPort, interrupts necessary for any additional downstream devices also need to be transported. Accordingly, an HPD interrupt packet is supplied that travels across the upstream channel 116. Thus, a virtualized HPD connection is provided. The HPD interrupt packet is further able to be communicated to the operating system faster than the interrupt is delivered by traditional DisplayPort HPD 18 simply by being able to be sent over a high speed connection.

The HPD interrupt packet includes interrupt vector data. Accordingly, upon receiving the interrupt packet, the operating system triggers the interrupt event and also already has a memory address of an appropriate interrupt handler. In this way, the operating system is not required to query the device that generated the interrupt for such information. Furthermore, the operating system need not consult with a lookup table to determine the vector data. Removing the need to query the downstream device and/or table creates a faster response time. Thus, in addition to travelling over a higher speed connection, more information about the desired actions that result from the interrupt can be provided with the interrupt. While faster response times are beneficial generally, the increased speed is particularly useful for downstream devices that are time sensitive such as touch screens where real-time interaction with the device is occurring.

The HPD interrupt packet (virtualized HPD 118) is also used to force a system operating in enhanced DisplayPort mode into traditional DisplayPort mode. If the virtualized HPD interrupt sends a non-standard type of interrupt, the enhanced DisplayPort drivers can instruct for traditional DisplayPort protocol to be employed. Similarly, if an upstream device attempts to read the cause of a received interrupt and such attempt is performed over the AUX channel (virtualized) and no cause is found or if the cause is unable to be read, then the operating system again has the option to instruct for traditional DisplayPort protocol to be employed.

Additional enhanced DisplayPort packets can be defined to offer additional functionality across the virtual AUX channels. One embodiment would be a specialized packet employed to send messages downstream as well. By way of example, one implementation includes using a specialized packet being sent downstream to act as a "wake" signal. A downstream device, including PCIe device, is set to watch for the signal and a specific interrupt vector. Upon detecting the signal and interrupt vector, the device enters wake up mode. The use of downstream virtualized HPD messages is further envisioned to support broadcasting of a message to multiple downstream devices such that communications are conserved by not needing discreet signals for each downstream device.

Figure 6:
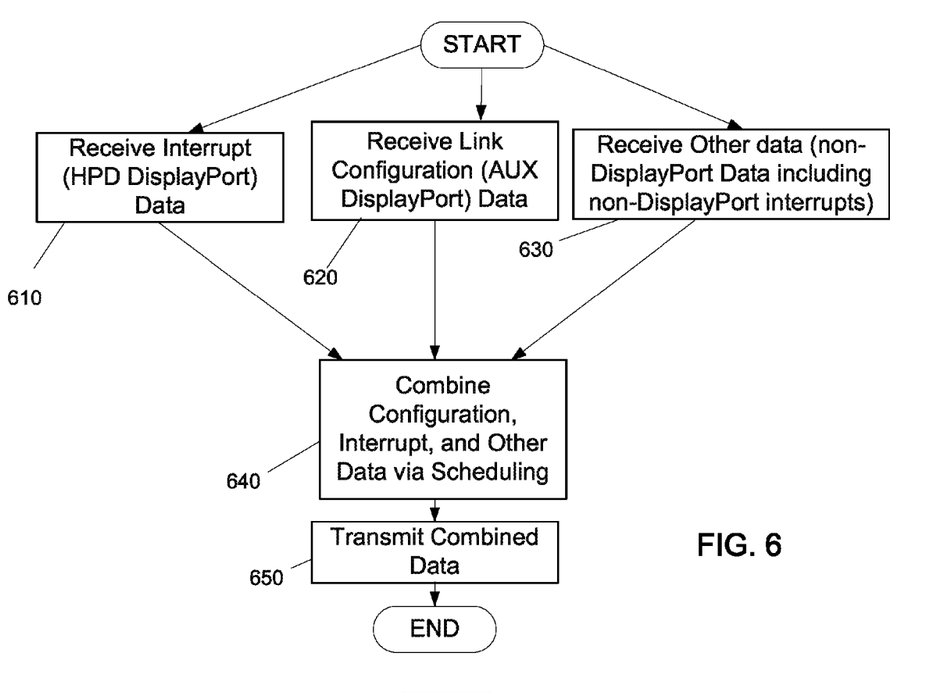

The downstream device thus receives or produces non-DisplayPort data (including non-DisplayPort special packets) (block 630), link configuration/training data (block 620) and HPD data (block 610). This data is combined (block 640) and transmitted upstream (block 650).

Thus, for an upstream device, a combination signal is received (block 500) that includes some or all of "other" (non-DisplayPort) data (including non-DisplayPort special packets), link configuration/maintenance (AUX) data, HPD interrupt data and other interrupt data. The upstream device then separates each of these pieces (blocks 510, 520, 530 and 540) and distributes them for appropriate treatment/processing.

Figure 7:
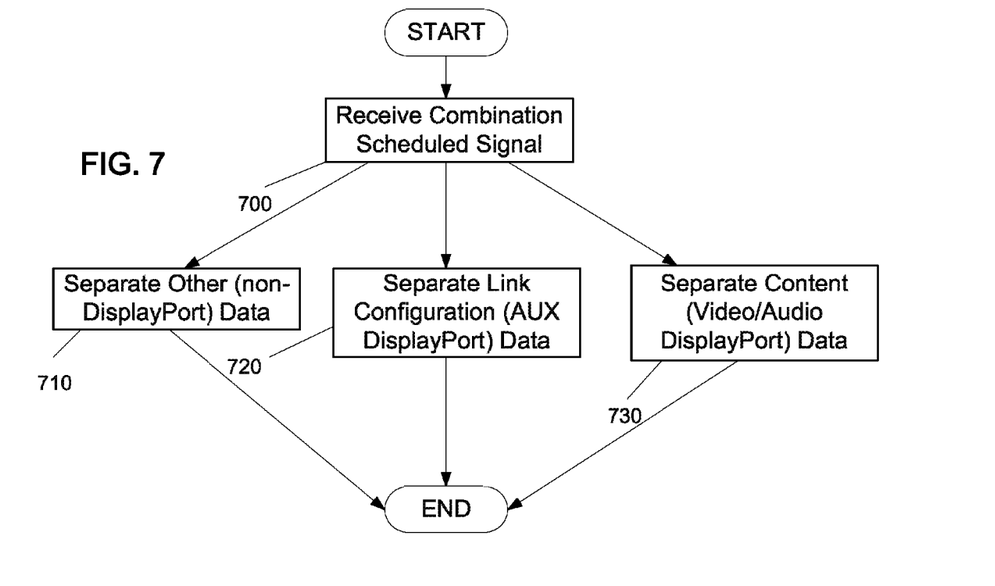

Similarly, a downstream device receives a combination signal (block 700) on downstream lane 14 and then separates out the other (non-DisplayPort) data (block 710), link configuration/training data (block 720) and content (DisplayPort video/audio) data (block 730). While the above disclosure has been put forth with reference to DisplayPort technology, it should be appreciated that the concepts can be applied to any system where signal training is present (such as PCI).

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

The software operations described herein can be implemented in hardware such as discrete logic fixed function circuits including but not limited to state machines, field programmable gate arrays, application-specific circuits or other suitable hardware. The hardware may be represented in executable code stored in non-transitory memory such as RAM, ROM or other suitable memory in hardware descriptor languages such as, but not limited to, RTL and VHDL or any other suitable format. The executable code when executed may cause an integrated fabrication system to fabricate an IC with the operations described herein.

Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer-readable medium such as, but not limited to, CDROM, RAM, other forms of ROM, hard drives, distributed memory, etc. The instructions may be represented by any suitable language such as, but not limited to, hardware descriptor language (HDL), Verilog or other suitable language. As such, the logic, software and circuits described herein may also be produced as integrated circuits by such systems using the computer-readable medium with instructions stored therein. For example, an integrated circuit with the aforedescribed software, logic and structure may be created using such integrated circuit fabrication systems. In such a system, the computer readable medium stores instructions executable by one or more integrated circuit design systems that cause the one or more integrated circuit design systems to produce an integrated circuit.

What is claimed is:

1. A method of operating a data link having data lanes including:
   supplying first data on one or more high-speed data lanes of a data interface, the interface including at least five high-speed data lanes for operation between a video source device and a video sink device, each of the at least five high-speed data lanes operable to transmit data at greater than 1 G bit/sec, the first data including one or more of video stream data, audio stream data, and source-sink interface configuration data and sink related interrupt data; and
   receiving second data on one or more of the at least five high-speed data lanes of the data interface, the second data being data other than video stream data, audio stream data, source-sink interface configuration data, and sink related interrupt data.

2. The method of claim 1, wherein the second data is received via a first cable and the first data is supplied to the first cable.

3. The method of claim 1, wherein the second data is received via a first unidirectional incoming data lane.

4. The method of claim 1, further including supplying second data on one or more data lanes of the data connection.

5. The method of claim 4, wherein first data and second data are supplied on a common data lane.

6. The method of claim 1, wherein first data and second data are received on a common data lane.

7. The method of claim 1, wherein each of the data lanes is in electrical communication with a common cable.

8. The method of claim 1, further including receiving an interrupt request signal from a data lane of the data connection.

9. The method of claim 1, wherein the second data is transmitted to a graphics memory prior to being sent to a main memory.

10. The method of claim 9, wherein video processing is performed on the data at the graphics memory.

11. The method of claim 1, wherein the second data includes packets having interrupt data therein.

12. The method of claim 11, wherein the interrupt data includes interrupt vector data.

13. The method of claim 1, further including receiving second data on two data lanes of the data connection.

14. The method of claim 1, further including supplying second data on the one or more data lines supplying first data.

15. The method of claim 1, wherein the data link is compliant with the DisplayPort specification.

16. A data interface including:
at least five nodes each operable to perform at least one of supplying and receiving high-speed signals between a video source device and a video sink device, high-speed signals being those operating at greater than 1 GB bit/sec, each node operable to interface with a respective wire of a first cable, the five nodes including:
a first node operable to supply a first high-speed signal, the first signal including at least one of video stream data, audio stream data, source-sink interface configuration data and sink related interrupt data; and
a second node operable to receive a second signal, the second signal including data other than video stream data, audio stream data, source-sink interface configuration data and sink related interrupt data.

17. The interface of claim 16, wherein the data interface is further operable to supply second data to the first node, the second data including data other than video stream data, audio stream data, source-sink interface configuration data and sink related interrupt data.

18. The interface of claim 17, wherein first data and second data are supplied to the first node.

19. The interface of claim 18, wherein the first data and second data are multiplexed together.

20. The interface of claim 16, wherein the second node is operable to receive first data and second data, the second data including data other than video stream data, audio stream data, source-sink interface configuration data and sink related interrupt data.

21. The interface of claim 16, further including a third node operable to receive sink interrupt communications.

22. The interface of claim 16, wherein the first signal is compliant with the DisplayPort specification.

23. A non-transitory computer readable medium containing instructions thereon, that when interpreted by at least one processor, cause the at least one processor to:
supply first data on one or more data lanes of a data connection having at least five high-speed data lanes, each of the high-speed data lanes operable to transmit data at greater than 1 G bit/sec, the first data including at least one of video stream data, audio stream data, source-sink interface configuration data and sink related interrupt data.

24. The medium of claim 23, wherein the first data is supplied so as to be compliant with the DisplayPort specification.

25. The method of claim 1, wherein receiving the second data includes receiving second data on one or more unidirectional high-speed data lanes.

26. The method of claim 1, wherein the data interface includes six high-speed data lanes.

27. The data interface of claim 16, wherein the second node is operable to interface with a second wire of the first cable to receive the second signal from a first unidirectional incoming data lane.

28. The data interface of claim 16, wherein the at least five nodes include six nodes.

29. The interface of claim 28, further including graphics memory to which the second data is transmitted prior to being sent to a main memory.

30. The interface of claim 29, wherein the graphics memory is operable to perform video processing on the data.

31. The interface of claim 28, further including a packet handler operable to extract interrupt data from packets within the second data.

32. The interface of claim 31, wherein the interrupt data includes interrupt vector data.

33. The interface of claim 28, further including a third node operable to receive second data from a third wire of the first cable.

34. The medium of claim 23, wherein the instructions further cause the processor to receive second data on one or more unidirectional data lanes of the data lanes of the data interface, the second data including data other than video stream data, audio stream data, source-sink interface configuration data and sink related interrupt data.

* * * * *